United States Patent
Ryoo

(10) Patent No.: US 8,022,680 B2
(45) Date of Patent: Sep. 20, 2011

(54) SWITCHING DC-DC CONVERTER WITH ADAPTIVE-MINIMUM-ON-TIME CONTROL AND METHOD OF ADAPTIVELY CONTROLLING MINIMUM-ON-TIME OF A SWITCHING DC-DC CONVERTER

(75) Inventor: Ji-Yeoul Ryoo, Hweseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 551 days.

(21) Appl. No.: 12/078,261

(22) Filed: Mar. 28, 2008

(65) Prior Publication Data

US 2009/0058383 A1 Mar. 5, 2009

(30) Foreign Application Priority Data

Aug. 28, 2007 (KR) ..................... 10-2007-0086371

(51) Int. Cl.
*G05F 1/10* (2006.01)
(52) U.S. Cl. ....................................................... 323/282
(58) Field of Classification Search .................. 323/222, 323/282, 283, 288, 299–301; 363/132
See application file for complete search history.

(56) References Cited

U.S. PATENT DOCUMENTS

| | | | |
|---|---|---|---|
| 5,414,342 A * | 5/1995 | Mammano et al. | 323/288 |
| 5,550,730 A | 8/1996 | Seki | |
| 5,627,459 A * | 5/1997 | Itoyama et al. | 323/283 |
| 6,943,533 B2 * | 9/2005 | Okuno | 323/222 |
| 7,208,921 B2 | 4/2007 | Walters | |
| 7,609,040 B1 * | 10/2009 | Jain | 323/283 |
| 2005/0017702 A1 * | 1/2005 | Kernahan et al. | 323/282 |
| 2005/0151518 A1 * | 7/2005 | Schneiker et al. | 323/222 |
| 2005/0184717 A1 | 8/2005 | Walters | |
| 2007/0064460 A1 * | 3/2007 | Siman-Tov | 363/132 |

* cited by examiner

Primary Examiner — Adolf Berhane
Assistant Examiner — Yemane Mehari
(74) Attorney, Agent, or Firm — Lee & Morse, P.C.

(57) ABSTRACT

A power converter includes a power switch adapted to receive an input power from an external power source and to generate an output power, and an adaptive oscillator adapted to output an adaptive minimum-on signal of the power switch in response to a change in measured magnitude of at least one of the input power and the output power.

22 Claims, 10 Drawing Sheets

100

SWITCHING DC-DC CONVERTER WITH ADAPTIVE-MINIMUM-ON-TIME CONTROL AND METHOD OF ADAPTIVELY CONTROLLING MINIMUM-ON-TIME OF A SWITCHING DC-DC CONVERTER

BACKGROUND OF THE INVENTION

1. Field of the Invention

Embodiments relate to switching DC-DC power converters including adaptive-minimum-on-time control and methods of adaptively controlling minimum-on-time for switching DC-DC power converters. More particularly, embodiments relate to switching DC-DC power converters including adaptive-minimum-on-time control and methods of adaptively controlling minimum-on-time of switching DC-DC converters, which may enable a reduction in switching loss by adaptively controlling a duty cycle of a power switch thereof based on, e.g., a magnitude of an input (or output) voltage.

2. Description of the Related Art

Switching DC-DC power converters, e.g., buck converters, may be employed in various electronic devices, e.g., mobile phones, laptop computers, etc., which receive power from a voltage source, e.g., a battery. Such electronic devices may include a plurality of circuits, e.g., an encoder, a decoder, a memory, a processor, etc., each of which may require a different voltage level than a voltage level supplied from a battery of the electronic device, and thus, DC-DC power converters may be employed to generate multiple controlled voltages from the single battery voltage.

A DC-DC converter may accept an input DC voltage Vin and may generate an output DC voltage Vo by, e.g., controllably storing energy in a component(s), e.g., a magnetic component such as an inductor. The amount of energy stored in the component(s) may be controlled by adjusting a duty cycle (ratio of on/off time) of, e.g., a power switch (e.g., two transistors connected in series between a first voltage source and a second voltage source) through which current and/or voltage is supplied. Accordingly, an output voltage Vo of a DC-DC converter is generally based on at least the input DC voltage Vin and the duty cycle of the transistors of the power switch, i.e., an amount of time the respective transistors are on and a number of times of the power switch is switched on and off.

In known devices, a minimum on-time of the power switch is set based on a maximum voltage of the battery of the electronic device. However, characteristics of the input DC voltage Vin supplied from a battery of the electronic device may change, e.g., decrease, over time. Therefore, in such known DC-DC converters efficiency thereof may decrease over time as the input DC voltage Vin supplied thereto decreases.

Further, with regard to the duty cycle of the power switch, some power is generally lost during operation of a switch. Power loss generally corresponds to a sum of conduction loss and switching loss. Conduction loss is generally proportional to a magnitude of output current, while switching loss is generally proportional to a number of switching times of the power switch. More particularly, power switching loss Psw may be represented by Equation 1:

$$Psw = CV^2 f \quad \text{(Equation 1)}$$

where C is parasitic capacitance of transistor(s) of the power switch, V is the charged voltage of the parasitic capacitance C, and f is the number of switching times for generating a desired output voltage Vo (or current).

Accordingly, it is desirable to provide a DC-DC converter that adaptively controls a minimum-on-time of the power switch in view of a change in the DC input voltage Vin and/or the power switching loss of the power switch.

SUMMARY OF THE INVENTION

Embodiments are therefore directed to a switching DC-DC converter and method of controlling a switching DC-DC converter, which overcome one or more of the problems associated with the related art.

It is therefore a feature of an embodiment to provide a switching DC-DC converter with adaptive-minimum-on-time control and a method of adaptively controlling minimum-on-time of a switching DC-DC converter It is therefore a separate feature of an embodiment to provide a switching DC-DC converter that may adaptively set a minimum-on-time based on an input DC voltage.

It is therefore a separate feature of an embodiment to provide a method of controlling a DC-DC converter such that a minimum-on-time may be set based on a detected input DC voltage.

At least one of the above and other features and advantages may be realized by providing a power converter, including a power switch adapted to receive an input power from an external power source and to generate an output power, and an adaptive oscillator adapted to output an adaptive minimum on signal of the power switch in response to a change in measured magnitude of at least one of the input power and the output power.

The power converter may include a controller adapted to output a PWM signal to the power switch, the PWM signal being determined in accordance with a SET signal, a RESET signal and the adaptive minimum-on signal.

Duration of the PWM signal may be determined in accordance with a later of a falling edge of the adaptive minimum-on signal and a rising edge of the RESET signal. The converter may include a synchronizer adapted to synchronize a rising edge of the adaptive minimum-on signal with a rising edge of the SET signal. The adaptive oscillator may include a first comparator adapted to compare the measured magnitude to a reference value and to output a first comparison value, and a second comparator adapted to compare the first comparison value to a charge value realized during a charge period of the SET signal and to output a second comparison value.

The power converter may include a synchronizer adapted to synchronize a rising edge of the adaptive minimum-on signal with a rising edge of the SET signal. A falling edge of the adaptive minimum-on signal may correspond to the second comparison value indicating the first comparison value exceeds the charge value.

At least one of the above and other features and advantages may be separately realized by providing an integrated circuit, including a power switch adapted to receive an input power from an external power source and generate an output power, and a controller adapted to output a PWM signal to the power switch, the PWM signal being determined in accordance with a SET signal, a RESET signal and an adaptive minimum-on signal varying in accordance with a change in a measured magnitude of at least one of the input power and the output power.

At least one of the above and other features and advantages may be separately realized by providing a method of driving a power switch in a power converter, including detecting a change in a magnitude of at least one of an input power from an external power source input to the power switch and an output power output from the power switch, generating an adaptive minimum-on signal in accordance with detected magnitude, and driving the power switch using the adaptive minimum-on signal.

Driving the power switch may include using a SET signal and a RESET signal. The method may include synchronizing a rising time of the adaptive minimum-on signal with a rising time of the SET signal. Generating the adaptive minimum-on signal may include comparing the detected magnitude to a reference value and outputting a first comparison value, and comparing the first comparison value to a charge value realized during a charge period of the SET signal and outputting a second comparison value.

Generating the adaptive minimum-on signal may include providing a falling edge of the adaptive minimum-on signal when the second comparison value indicates the first comparison value exceeds the charge value.

Driving the power switch may include generating a PWM signal from the SET signal, the RESET signal and the adaptive minimum-on signal.

The PWM signal may become low in response to the rising edge of the SET signal and becomes high in response to a later one of a falling edge of the adaptive minimum-on signal and a rising edge of the RESET signal. Duration of the adaptive minimum-on signal may be inversely proportional to the detected magnitude.

At least one of the above and other features and advantages may be separately realized by providing a power converter, including a power switch adapted to receive an input power from an external power source and generate an output power, and an adaptive minimum-on signal generating unit for generating an adaptive minimum-on signal of the power switch having a duration that is inversely proportional to a measured magnitude of at least one of the input power and the output power.

At least one of the above and other features and advantages may be separately realized by providing an integrated circuit, including a power switch, a processing unit, and a memory unit operably coupled to the processing unit, the memory including operational instructions causing the processing unit to detect a change in magnitude of at least one of an input power from an external power source input to the power switch and an output power output from the power switch, generate an adaptive minimum-on signal in accordance with the detected magnitude, and drive the power switch using the adaptive minimum-on signal.

The integrated circuit may include a functional circuit adapted to receive power from the power switch. The power from the power switch may be supplied to an external functional circuit.

At least one of the above and other features and advantages may be separately realized by providing an adaptive oscillator, including a detector adapted to detect a change in a measured magnitude of a first signal and to output a detected value, and a comparator adapted to compare the detected value to a second signal having a ramped rising slope and an instantaneous falling slope and to output a third signal having a duration that is inversely proportional to the detected value.

The detector may include a comparator adapted to compare the measured magnitude to a predetermined value. The ramped rising slope may correspond to a charging period of a capacitor and the instantaneous falling slope corresponds to a discharging period of the capacitor. The adaptive oscillator may include a synchronizer adapted to synchronize a ramp start time of the second signal and a rising edge of the third signal. A falling edge of the third signal may correspond to an intersection of the detected value and the second signal.

At least one of the above and other features and advantages may be separately realized by providing an article of manufacture having a machine accessible medium including data that, when accessed by a machine, cause the machine to perform a method of driving a power switch in a power converter, the method including detecting a change in a magnitude of at least one of an input power from an external power source input to the power switch and an output power output from the power switch, generating an adaptive minimum-on signal in accordance with detected magnitude, and driving the power switch using the adaptive minimum-on signal.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Korean Patent Application No. 2007-86371, filed on Aug. 28, 2007, in the Korean Intellectual Property Office, and entitled: "Switching DC-DC Converter with Adaptive-Minimum-on-Time Control and Method of Adaptively Controlling Minimum-on-Time of a Switching DC-DC Converter," is incorporated by reference herein in its entirety.

Embodiments of the invention will be described more fully hereinafter with reference to the accompanying drawings illustrating the exemplary embodiments. Aspects of the invention may, however, be embodied in different forms and should not be construed as limited to the embodiments set forth herein. Rather, these exemplary embodiments are provided so that this disclosure will be thorough and complete, and will fully convey the scope of the invention to those skilled in the art.

Unless otherwise defined, all terms used herein, including technical and scientific terms, have the meaning as commonly understood by one of ordinary skill in the art. It will be further understood that terms such as those defined in commonly used dictionaries should be interpreted as having a meaning that is consistent with their meaning in the context of the relevant art, and not in an idealized or overly formal sense unless expressly so defined herein.

Figure 1:
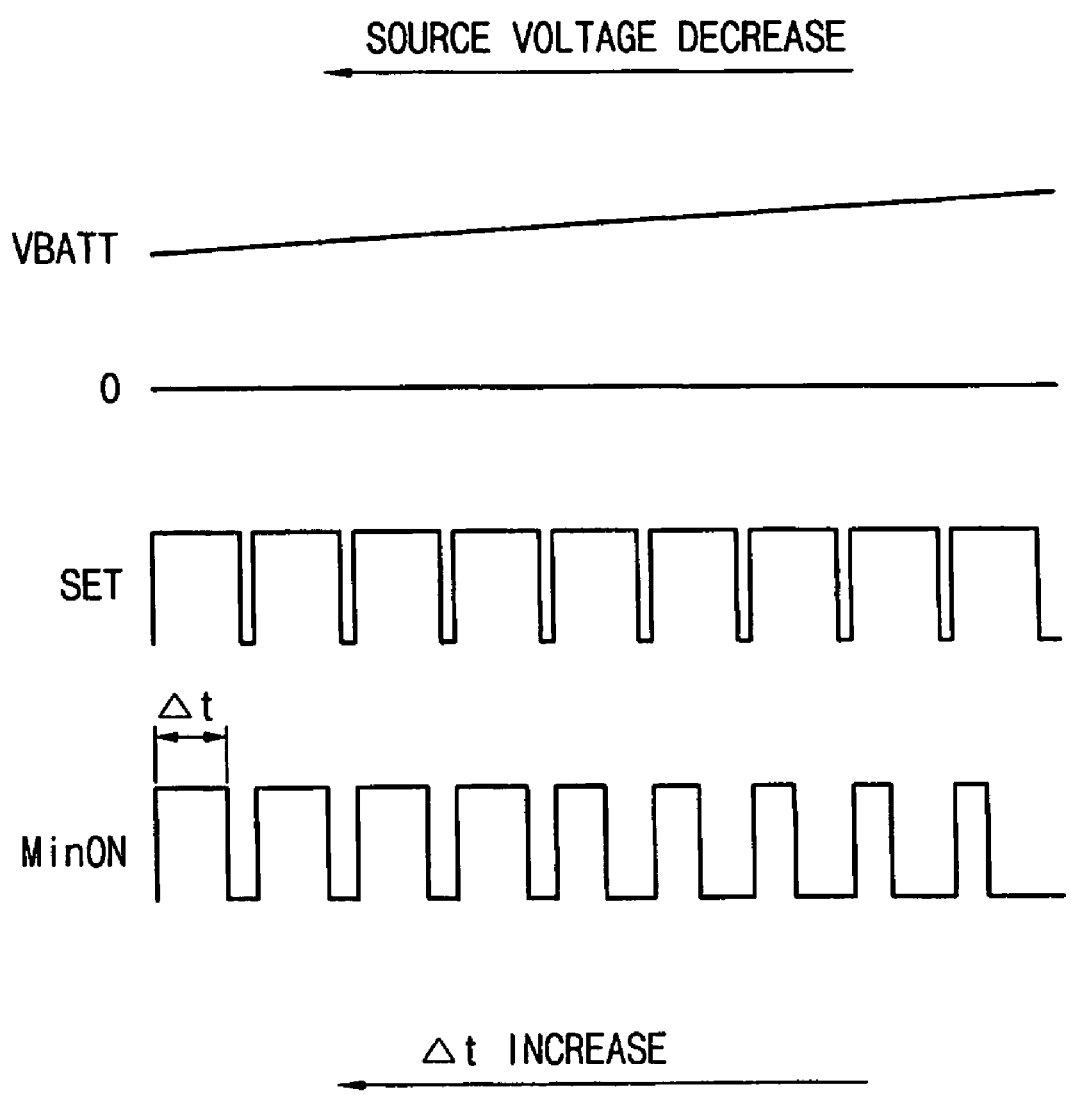
FIG. 1 illustrates a general timing diagram of a switching DC-DC converter according to an embodiment.

FIG. 1 illustrates a general timing diagram of a switching DC-DC converter according to an embodiment. As illustrated in FIG. 1, in an embodiment of the invention, as a source voltage signal VBATT supplied to a DC-DC converter increases, characteristics of a minimum-on-time signal MinOn, corresponding to a signal supplied to a power switch of the DC-DC converter, may change. For example, a time period Δt between respective rising and falling edges of the minimum-on-time signal MinOn may decrease. That is, a minimum duty of the minimum-on-time signal MinOn may be set and changed based on a detected magnitude of a maximum supply voltage.

That is, while a set signal SET, i.e., a fixed duty clock signal, may have a uniform pulse waveform such that a time period between adjacent rising and falling edges thereof is constant, pulse-widths of the minimum-on-time signal MinOn, i.e., a variable duty clock, may vary based on a characteristic(s) of the source voltage signal VBATT. More particularly, rising edges of the minimum-on-time signal MinOn may correspond to, i.e., may simultaneously coincide with, rising edges of the set signal SET and falling edges of the minimum-on-time signal MinOn may vary in time relative to the respective rising edge of the set signal SET.

Further, e.g., in an embodiment of the invention, as the input source voltage signal VBATT decreases, the pulse-width of the minimum-on-time signal MinOn may gradually increase in proportion to a change in magnitude, e.g., an amount of decrease, in the input source voltage VBATT. For example, the minimum duty of the minimum-on-time signal MinOn may be increased according to a decrease in the magnitude of the input source voltage signal VBATT. Accordingly, in an embodiment of the invention, when a magnitude of the input source voltage signal VBATT decreases, a number of switching times of the power switch may be reduced and an on-time of the power switch may be increased. Thus, more energy may be generated and stored in a component(s), e.g., inductor, of the DC-DC generator, and output as a DC output voltage Vo therefrom. The DC output voltage Vo may be supplied to a functional circuit, e.g., encoder, decoder, processor, etc., electrically coupled to the DC-DC generator. As a result, by decreasing a switching loss of the power switch (by increasing a minimum on-time thereof) as, e.g., the input source voltage signal VBATT decreases, efficiency of the DC-DC converter may be increased.

Figure 2:
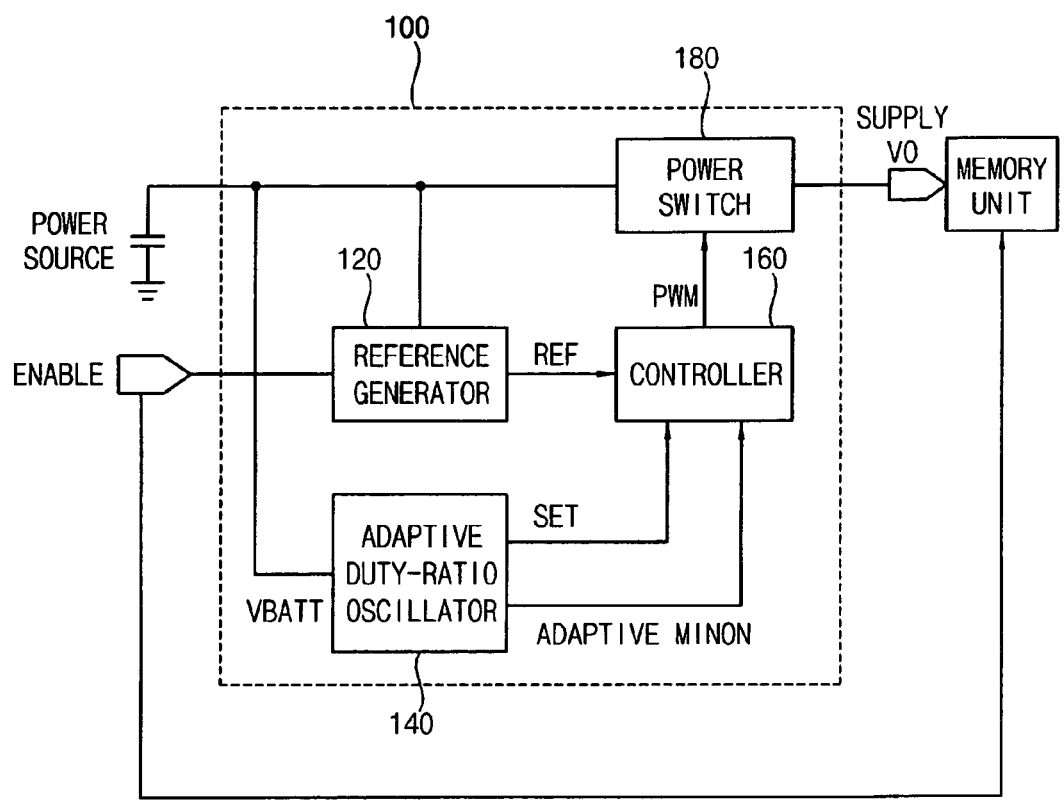
FIG. 2 illustrates a block diagram of a switching DC-DC converter according to an embodiment.

FIG. 2 illustrates a block diagram of a switching DC-DC converter 100 according to an embodiment. Referring to FIG. 2, the DC-DC converter 100 may include a reference generator 120, an adaptive duty-ratio oscillator 140, a controller 160, and a power switch 180. The DC-DC converter 100 may be connected to a power source supplying the input source voltage signal VBATT, a terminal supplying an enable signal Enable, and a terminal for outputting the DC output voltage Vo. As illustrated in FIG. 2, the reference generator 120 may output a reference signal REF to the controller 160. The adaptive duty-ratio oscillator 140 may output the set signal SET and the minimum-on signal MinON to the controller 160. In response, the controller 160 may output a pulse-width-modulated signal PWM to the power switch 180. The pulse-width-modulated signal PWM may control a duty cycle of the power switch 180, and thus, a magnitude of the DC output voltage Vo. The DC output voltage Vo may be supplied, e.g., to a memory unit, and the DC-DC converter 100 may be enabled to generate and output the output voltage Vo.

Figure 3:
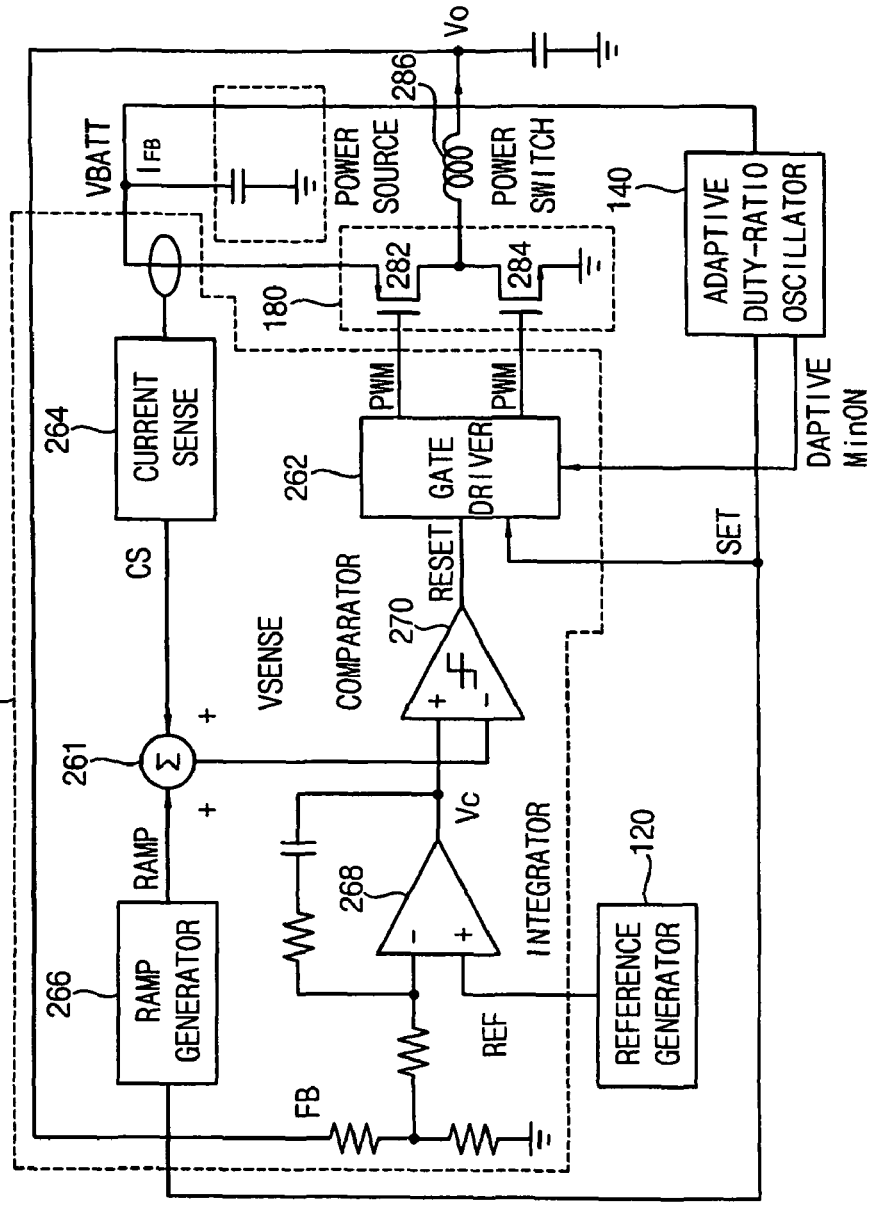
FIG. 3 illustrates a circuit diagram of a first exemplary embodiment of a DC-DC converter according to an embodiment.

FIG. 3 illustrates a circuit diagram of the first exemplary embodiment of a DC-DC converter 100 according to an embodiment. Referring to FIG. 3, the controller 160 may include an adder 261, a gate driver 262, a current sensor 264, a ramp generator 266, an integrator 268 and a comparator 270. The power switch 180 may include first and second transistors 282, 284 connected in series between a first power source, e.g., battery supplying the input source voltage signal VBATT, and a second power source, e.g., ground. The first transistor 282 may be a p-type, e.g., PMOS, transistor and the second transistor 284 may be an n-type, e.g., NMOS, transistor. Accordingly, the first transistor 282 may turn on when the pulse-width-modulated signal PWM is low and may turn off when the pulse-width-modulated signal PWM is high, and the second transistor 284 may turn on when the pulse-width-modulated signal PWM is high and may turn off when the when the pulse-width-modulated signal PWM is low. An output terminal of the power switch 180 may be electrically coupled to an inductor 286, and the pulse-width-modulated signal PWM, together with the inductor 286, may drive the power switch 180 to generate the DC output voltage Vo.

Referring to FIG. 3, the reference generator 120 may generate and output the reference voltage REF, which may be supplied to the integrator 268 of the controller 160. The integrator 268 may also receive a feedback DC output signal FB, and may generate a control voltage Vc based on the feedback DC output signal FB and the reference voltage REF.

The adaptive duty-ratio oscillator 140 may receive the input source voltage signal VBATT and may determine a change in the input source voltage VBATT therefrom. Based on the determined change in the input source voltage VBATT, the adaptive duty-ratio oscillator 140 may generate the set signal SET, which may be supplied to the gate driver 262 and the ramp generator 266. The adaptive duty-ratio oscillator 140 may also generate the adaptive minimum-on signal MinON based on the received input source voltage VBATT and may supply the adaptive minimum-on signal MinON to the gate driver 262. More particularly, when the DC-DC power converter 100 operates in steady state, the adaptive duty-ratio oscillator 140 may generate the set signal SET and the adaptive minimum-on signal MinON variable duty clock corresponding to a minimum on-time.

Figure 4:
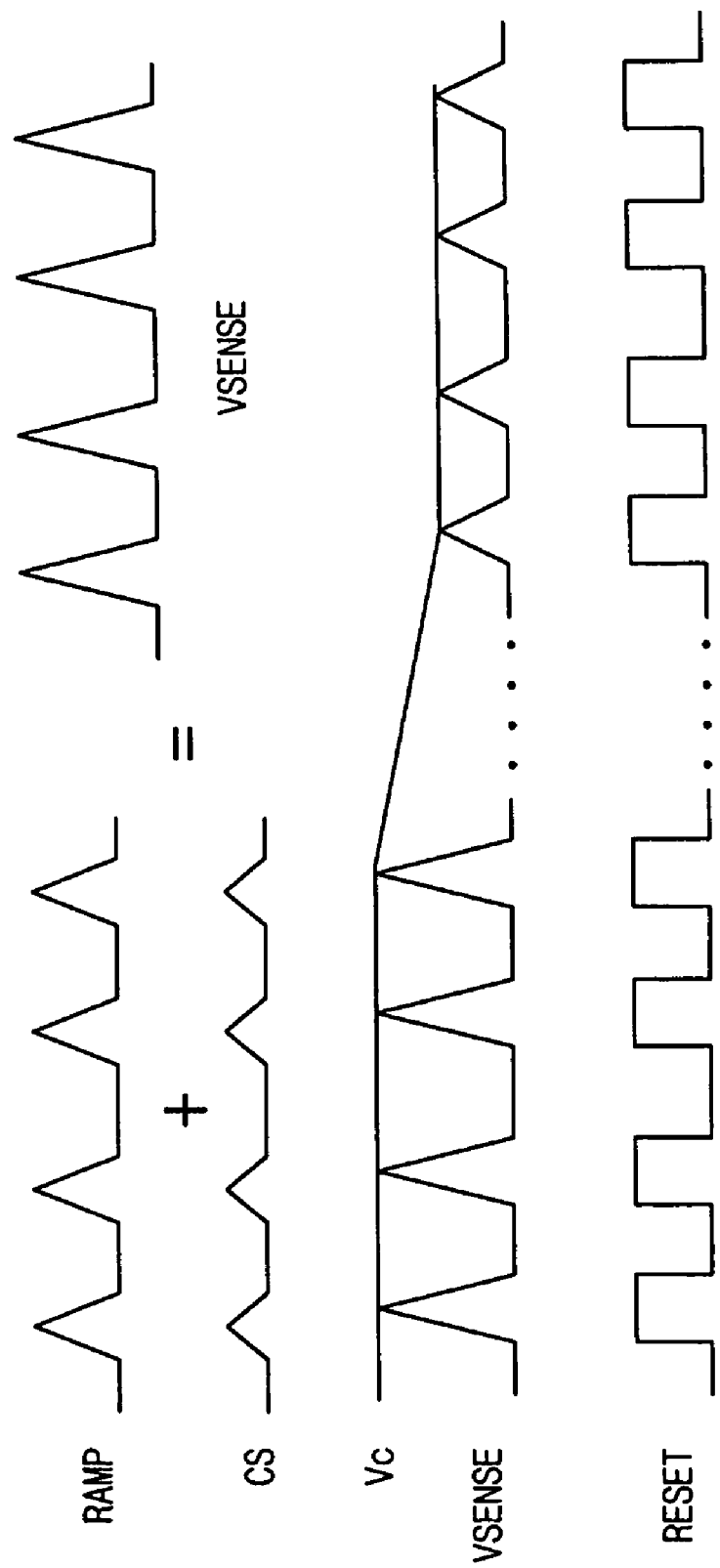
FIG. 4 illustrates waveform diagrams of exemplary signals employable by a ramp generator, current sensor and adder of the DC-DC converter of FIG. 3 in accordance with an embodiment.
Figure 5:
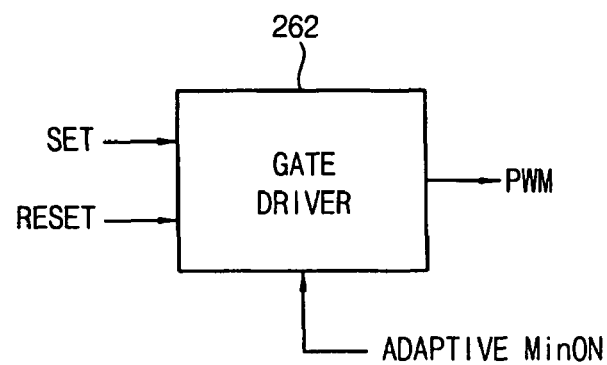
FIG. 5 illustrates a block diagram of the gate driver of the DC-DC converter of FIG. 3 in accordance with an embodiment.
Figure 6:
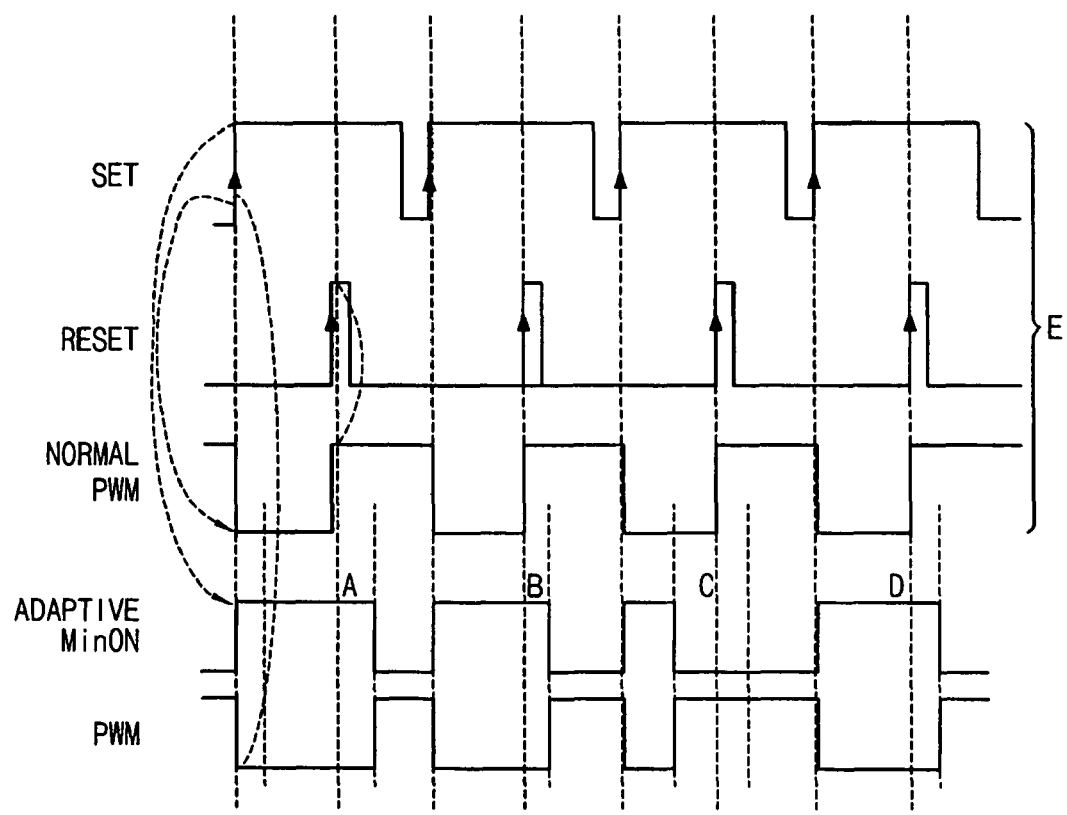
FIG. 6 illustrates waveform diagrams of exemplary signals employable by the gate driver of FIG. 5 in accordance with an embodiment.

FIG. 4 illustrates waveform diagrams of exemplary signals employable by the ramp generator 266, the current sensor 264 and the adder 261 of the DC-DC converter 100 of FIG. 3 in accordance with an embodiment, FIG. 5 illustrates a block diagram of the gate driver 262 of the DC-DC converter 100 of FIG. 3 in accordance with an embodiment, and FIG. 6 illustrates waveform diagrams of exemplary signals employable by the gate driver 262 of FIG. 5 in accordance with an embodiment.

Referring to FIGS. 3 and 4, the ramp generator 266 may receive the set signal SET and may output a ramp signal Ramp to the adder 261. The current sensor 264 may sense the current from the input source voltage VBATT, e.g., the battery, and may output a sensed current signal CS to the adder 261. As illustrated in FIG. 4, the ramp signal Ramp and the sensed current signal CS may be synchronized and have a same duty cycle in response to the set signal SET, and may help protect sub-harmonic oscillation. The adder 261 may receive the ramp signal Ramp and the sensed current signal CS, and may output a sensed voltage Vsense signal to one terminal of the comparator 270. The control voltage Vc output by the integrator 268 may be supplied to another terminal of the comparator 270. Thus, the comparator 270 may receive the sensed voltage signal Vsense and the control voltage Vc, and may output a reset signal RESET, based on a comparison thereof, to the gate driver 262.

Referring to FIGS. 3, 5 and 6, the gate driver 262 may receive the reset signal RESET, the set signal SET, and the adaptive minimum-on signal MinON, and may output a pulse-width-modulated signal PWM to the transistors 282, 284 of the power switch 180. In an embodiment of the invention, when the measured input source voltage VBATT supplied to the adaptive duty-ratio oscillator 140 changes, the adaptive duty-ratio oscillator 140 may output an adaptive minimum-on signal MinON having an adjusted pulse width based on, e.g., a switching loss of the power switch 180, in order to maintain efficiency of the DC-DC converter 100.

That is, e.g., in an embodiment of the invention, the adaptive duty-ratio oscillator 140 may increase a width of the adaptive minimum-on signal MinON in proportion to a decrease of the input source voltage VBATT so as to reduce a switching loss of the power switch 180 and maintain efficiency of the DC-DC converter 100. When the input source voltage VBATT supplied to the adaptive duty-ratio oscillator 140 increases relative to a previous measurement/determination, the adaptive duty-ratio oscillator 140 may decrease a width of the adaptive minimum-on signal MinOn to maintain an efficiency of the DC-DC converter 100.

Referring to FIG. 6, in a DC-DC controller that lacks an adaptive minimum-on time control mechanism, a pulse-width-modulated signal Normal PWM may have a constant duty cycle, wherein a falling edge of the pulse-width-modulated signal Normal PWM corresponds to a rising edge of the set signal SET and a rising edge of the pulse-width-modulated signal Normal PWM corresponds to a rising edge of the reset signal RESET.

On the other hand, in the DC-DC converter 100 including an adaptive minimum-on time control mechanism according to an embodiment of the invention, the pulse-width-modulated signal PWM may have a variable pattern. That is, in such a case, a falling edge of the pulse-width-modulated signal PWM may correspond to a rising edge of the adaptive minimum-on signal MinON, which may correspond to a rising edge of the set signal SET, while a rising edge of the pulse-width-modulated signal PWM may correspond to a falling edge of a same pulse the adaptive minimum-on signal MinON and/or a rising edge of the reset signal RESET. In an embodiment, the pulse-width-modulated signal PWM may correspond to an inverse of the adaptive minimum-on signal MinON.

Accordingly, in cases in which the input source voltage VBATT remains constant at a predetermined value or within a predetermined range, the rising edge of the adaptive minimum-on signal MinON, which may correspond to a falling edge of the pulse-width-modulated signal PWM, may also correspond to a rising edge of the reset signal RESET. However, in cases in which the input source voltage VBATT changes, the rising edge of the of the adaptive minimum-on signal MinON may occur after the rising edge of the reset signal RESET in order to improve efficiency. Thus, in such cases, the reset signal RESET may be ignored. Accordingly, in an embodiment, the rising edge of the pulse-width-modulated signal PWM may correspond to a later of the rising edge of the reset signal RESET and the falling edge of the adaptive minimum-on signal MinON.

Further, in an embodiment, the pulse-width-modulated signal PWM may be adjusted based on a change in the input source voltage VBATT, as determined by the adaptive duty-ratio oscillator 140. When the pulse-width-modulated signal PWM signal is low ("off"), the first transistor 282, i.e., the p-type transistor, is turned on and the second transistor 284, i.e., the n-type transistor, is turned off such that inductor current Iind may increase.

Figure 7:
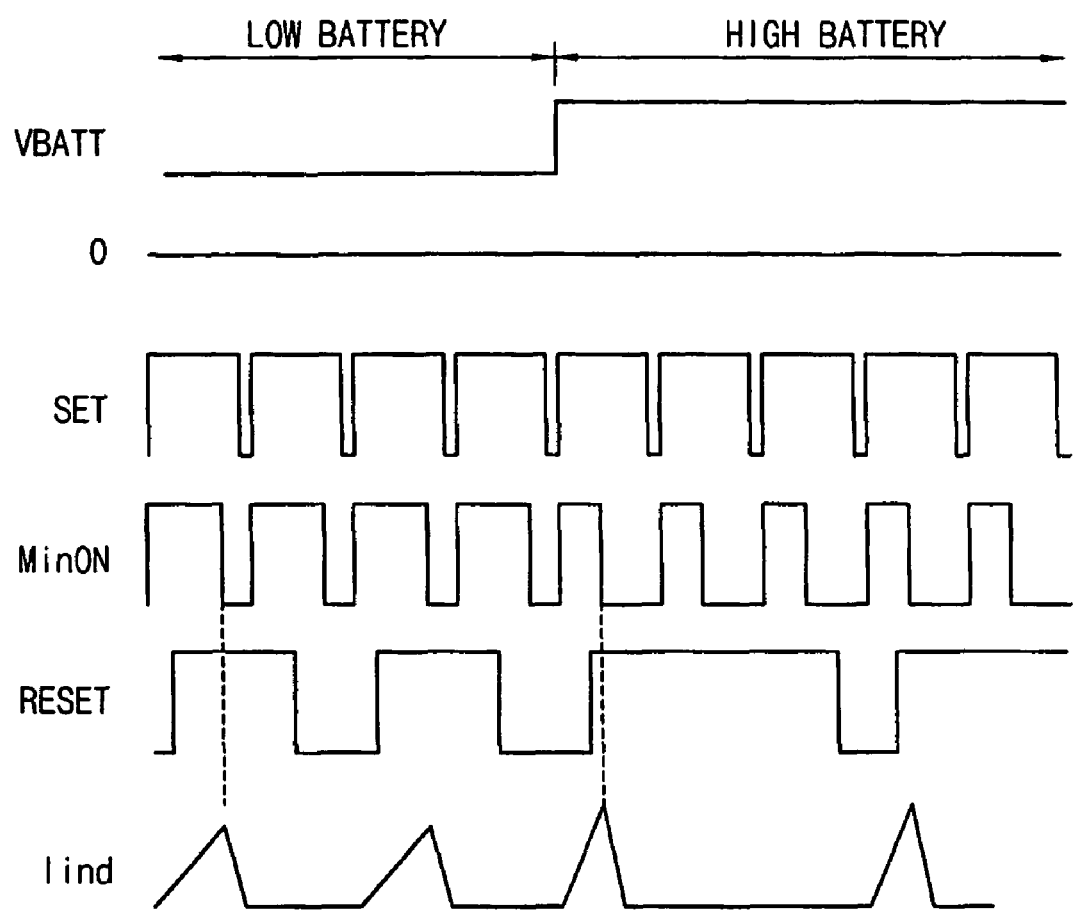
FIG. 7 illustrates an exemplary timing diagram for the DC-DC converter of FIG. 2.

FIG. 7 illustrates an exemplary timing diagram for the DC-DC converter 100 of FIG. 2. Referring to FIG. 7, the set signal SET may correspond to a fixed duty clock, while the minimum-on signal MinON may correspond to a variable duty clock. During a period, when a battery is at a low level, i.e., the input source voltage VBATT is at a relatively lower level, pulses of the minimum-on signal MinON may have wider widths than pulses of the minimum-on signal MinON during a period when the battery is at a relatively higher level, i.e., the input source voltage VBATT is at a relatively higher level. As a result of the wider width of the minimum-on signal MinOn, a time period Δt during which current flows through the inductor 286 may be increased so as to at least partially compensate for the a reduction in the input source voltage VBATT, and improve and/or maintain efficiency of the DC-DC converter 100. More particularly, in general current flowing through the inductor 286 follows the relationship set forth in Equation 2:

$$Iind = \Delta t (V_L / L) \qquad \text{(Equation 2)}$$

where Iind corresponds to the current flowing through the inductor 286, Δt corresponds to a time period during which the inductor 286 is charged, $V_L$ corresponds to the voltage stored in the inductor 286 and L corresponds to the inductance of the inductor 286. As may be seen from Equation 2, in an embodiment, it may be possible to fully or substantially compensate for a decrease in $V_L$ by increasing Δt by way of the minimum-on signal. Thus, in an embodiment of the invention, Δt of the minimum-on signal MinON may be larger during a relatively lower voltage period (e.g., low battery) than during a relatively higher voltage period (e.g., high battery).

Figure 8:
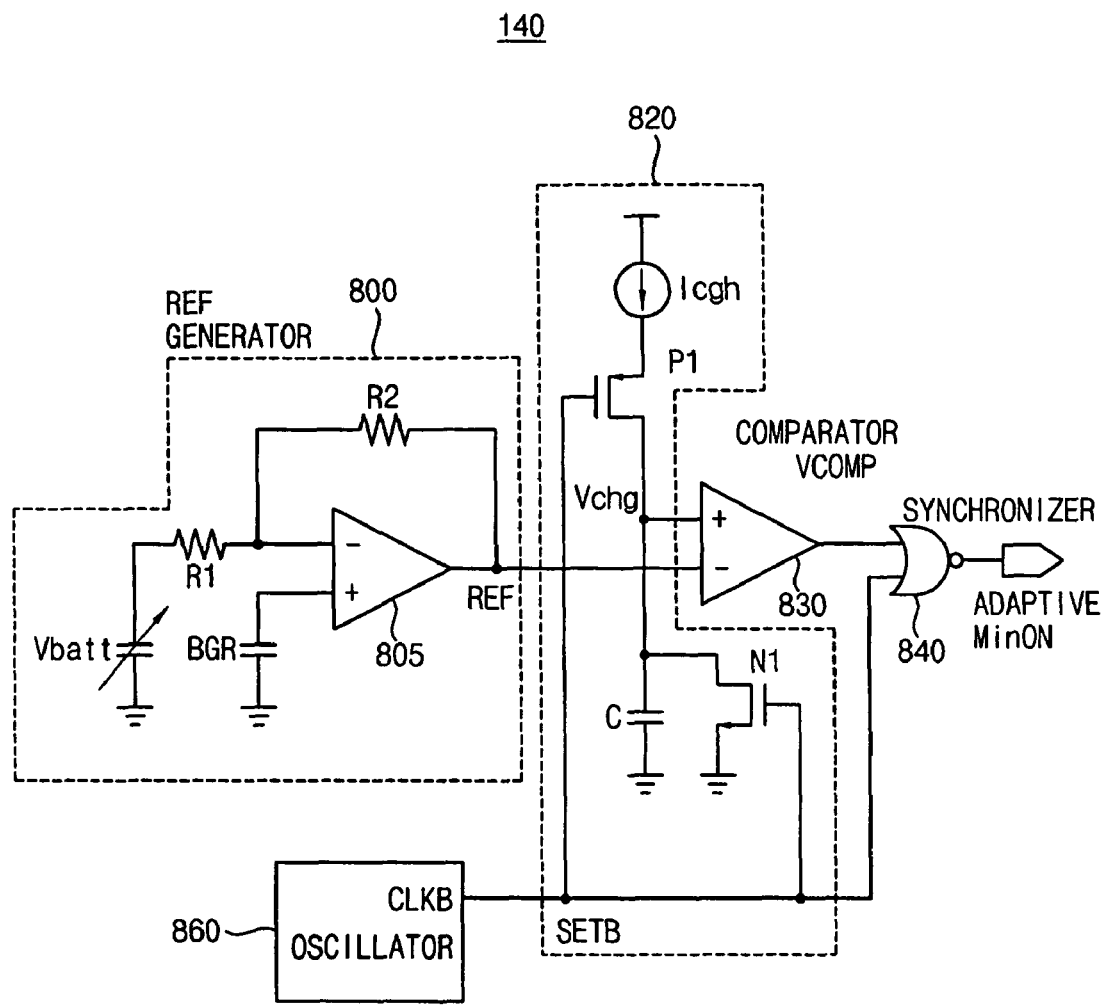
FIG. 8 illustrates a circuit diagram of an exemplary adaptive duty-ratio oscillator employable by the DC-DC converter of FIG. 3.
Figure 9:
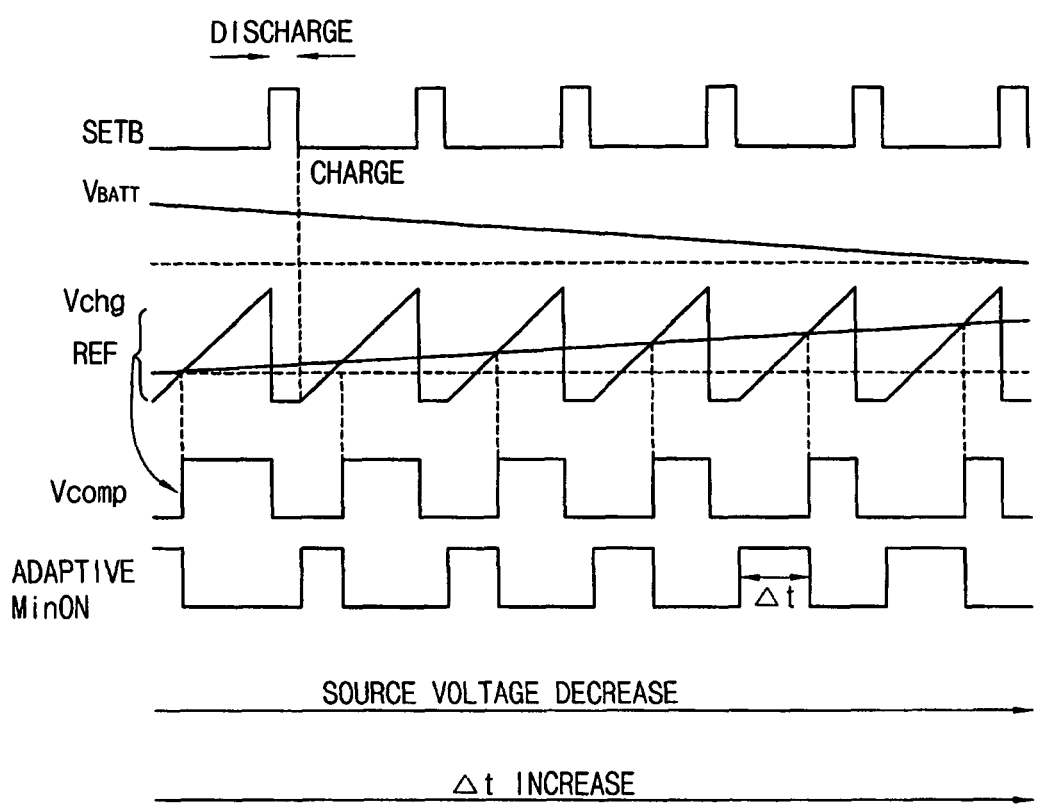
FIG. 9 illustrates an exemplary timing diagram for the adaptive duty-ratio oscillator of FIG. 8 in accordance with an embodiment.

FIG. 8 illustrates a circuit diagram of an exemplary adaptive duty-ratio oscillator 140 employable by the DC-DC converter 100 of FIG. 2, and FIG. 9 illustrates an exemplary timing diagram for the adaptive duty-ratio oscillator 140 of FIG. 8 in accordance with an embodiment.

Referring to FIG. 8, the adaptive duty-ratio oscillator 140 may include a reference generator 800, an oscillator 860, a pulse generator 820, a comparator 830, and a synchronizer 840. The reference generator 800 may include, e.g., a band-gap reference (BGR) circuit, a comparator 805, a voltage source, e.g., a battery, and resistors R1, R2, and may output a reference signal REF. The reference generator 800 may function as an inverting amplifier that receives the input source voltage VBATT and outputs the reference signal REF, which may correspond to an inverted and/or amplified input source voltage VBATT. The reference signal REF may be supplied to a first terminal of the comparator 830.

The charging-discharging pulse generator 820 may include a p-type transistor P1 and an n-type transistor N1, a current source Ichg, and a capacitor C, and may output a charged voltage pulse signal Vchg in response to an inverse set signal SETB, i.e., inverse of the set signal SET, supplied to gates of transistors P1, N1 thereof. The charged pulse signal Vchg may be supplied to another terminal of the comparator 830. The comparator 830 may compare the charged pulse signal Vchg and the reference signal REF, and may output a comparison voltage Vcomp to a first terminal of the synchronizer 840.

The oscillator 860 may generate and output the inverse set signal SETB to the gates of the transistors P1, N1 and a second terminal of the synchronizer 840. The synchronizer 840 is illustrated as a NOR gate, but is not limited thereto. The synchronizer 840 may synchronize the rising edges of the adaptive minimum-on signal MinON with the rising edges of the set signal SET, or as illustrated in FIG. 9, the falling edges of the inverse set signal SETB.

Referring to FIG. 9, the reference signal REF may be inversely proportional to the input source voltage VBATT. Thus, as the input source voltage VBATT decreases, the reference signal REF increases. Further, when the inverse set signal SETB is low, the n-transistor N1 of the charging-discharging pulse generator 820 is turned off, and the p-transistor P1 of the charging-discharging pulse generator 820 may turn on and charge the capacitor C such that the charged voltage Vchg may be at a high state. When the inverse set signal SETB is high, the p-transistor P1 of the charging-discharging pulse generator 820 is turned off, and the n-transistor N1 of the charging-discharging pulse generator 820 may turn on and discharge the capacitor C such that the charged voltage Vchg may be at a low state, as shown in FIG. 9.

Further, as shown in FIG. 9, the comparison voltage Vcomp may result from a comparison between the charged voltage Vchg and the reference signal REF. Rising edges of the comparison voltage Vcomp may correspond to points in time where the reference signal REF has a same magnitude as the charged voltage Vchg, and falling edges of the comparison voltage Vcomp may correspond to the falling edges of the inverse set signal SETB.

Referring to FIG. 9, falling edges of the adaptive minimum-on signal MinOn may correspond to the rising edges of the comparison voltage Vcomp and rising edges of the adaptive minimum-on signal MinON may correspond to falling edges of the inverse set signal SETB.

Further, referring to FIG. 9, as discussed above, as the input source voltage VBATT decreases, so may a time period Δt between respective falling and rising edges of the adaptive minimum-on signal MinON.

In the exemplary embodiments described above, the DC-DC converter 100 detected the input source voltage VBATT and controlled a duty ratio of a minimum-on-time signal MinON supplied to the power switch 180 based on the detected input source voltage VBATT. However, embodiments of the invention are not limited thereto. For example, in embodiments of the invention, an output voltage may be detected and a duty ratio of a minimum on-time signal MinON may be controlled based on the detected output voltage. In some embodiments, a duty ratio of a minimum on-time signal MinON may be based on both the detected output voltage and the detected input voltage.

Figure 10:
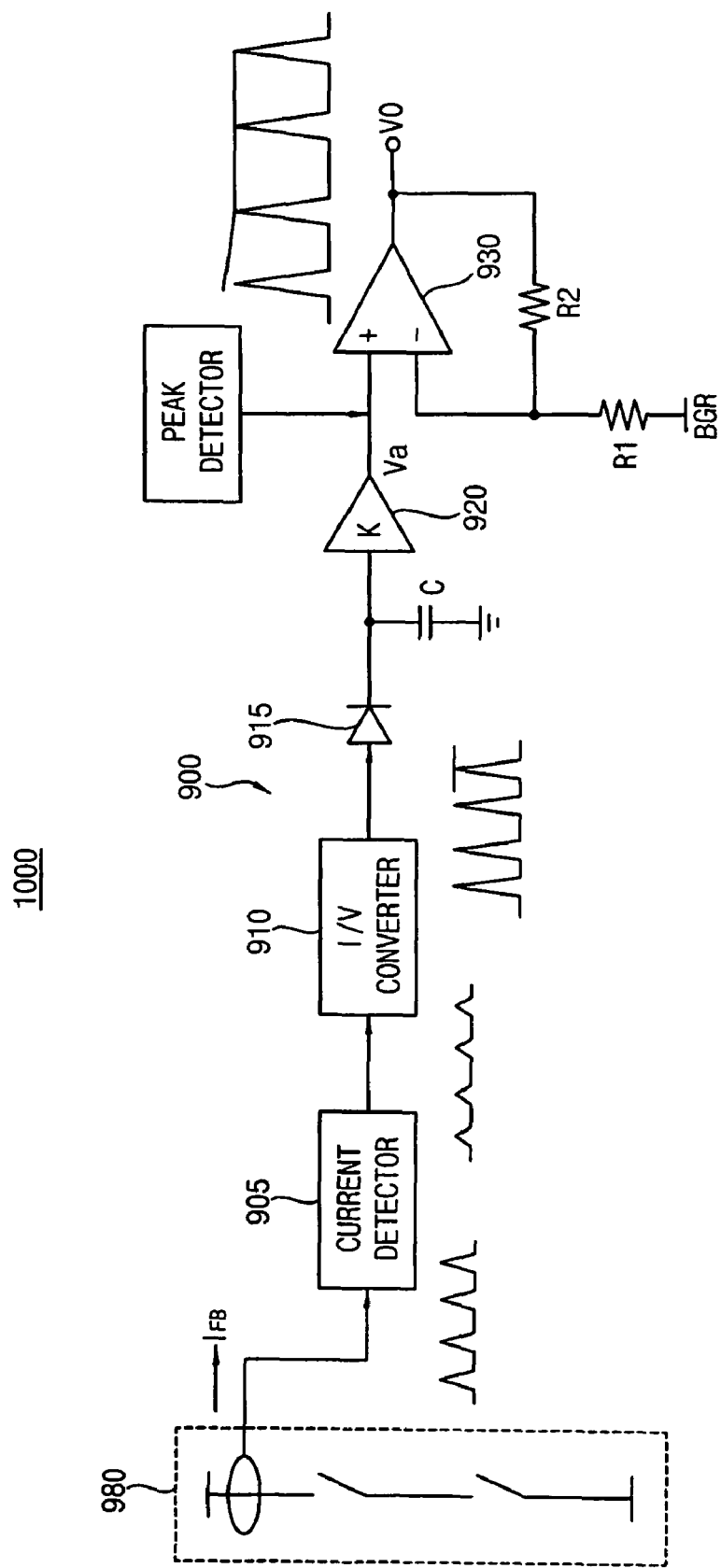
FIG. 10 illustrates a block diagram a switching DC-DC converter according to another embodiment.

FIG. 10 illustrates a block diagram a switching DC-DC converter 1000 according to another embodiment. In the exemplary embodiment illustrated in FIG. 10, the DC-DC converter 1000 may include a voltage detector 900 for detecting an output DC voltage Vo from a power switch 980. The voltage detector 900 may include, e.g., a current detector 905, an I/V converter 910, a diode 915, a capacitor C, an amplifier 920, a comparator 930 and resistors R1, R2. Accordingly, in some embodiments, a voltage detector may be employed to determine a DC output voltage and to adjust a minimum on-time MinON of a DC-DC generator based on the determined output voltage.

Figure 11:
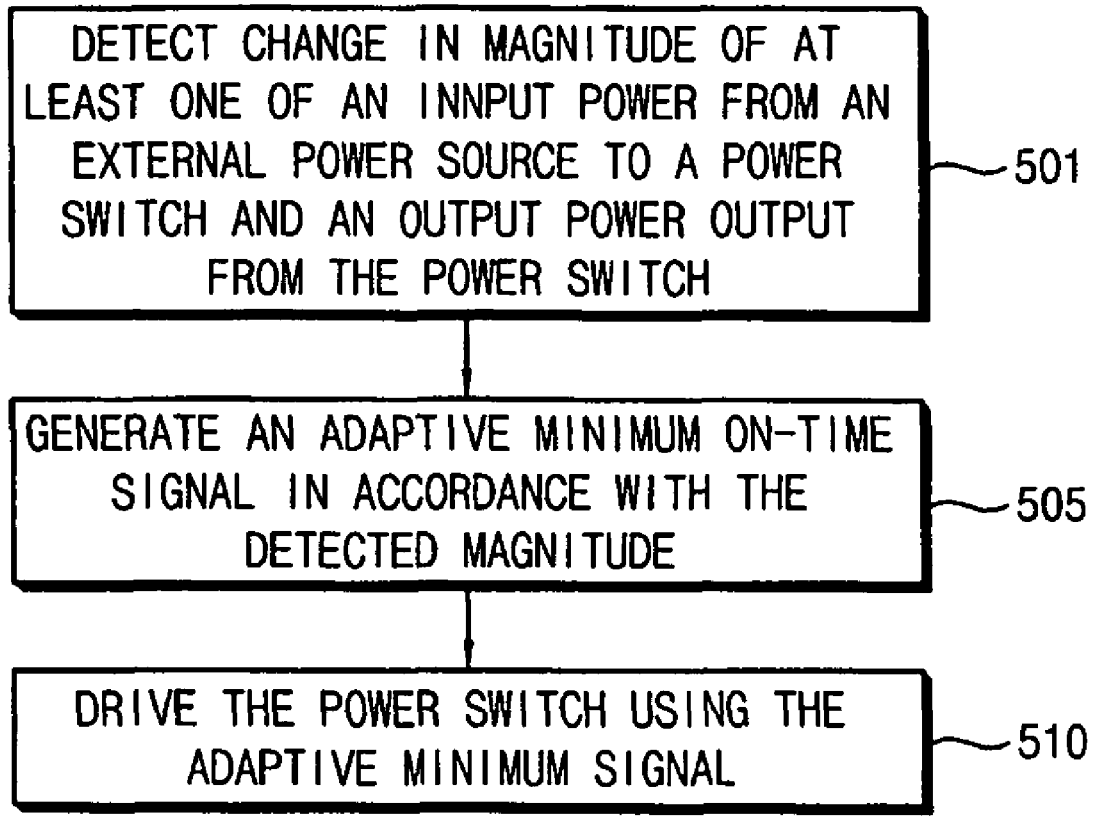
FIG. 11 illustrates a flow chart of an exemplary method of driving a power switch in a power converter according to an embodiment.

FIG. 11 illustrates a flow chart of an exemplary method of driving a power switch in a power converter in accordance with an exemplary embodiment. Referring to FIG. 11, the method may include detecting a change in a magnitude of at least one of an input power from an external power source input to the power switch and an output power output from the power switch (501). Next, the method may include generating an adaptive minimum-on signal in accordance with the detected magnitude (505). Further, the method may include driving the power switch using the adaptive minimum-on signal (510). As discussed above, by driving the power switch of the power converter based on the adaptive minimum-on signal, efficiency of the power converter may be improved by controlling a duty cycle of the power switch.

Exemplary embodiments of the invention have been disclosed herein, and although specific terms are employed, they are used and are to be interpreted in a generic and descriptive sense only and not for purpose of limitation. For example, the processing of the present invention may be implemented in software, e.g., by an article of manufacture having a machine-accessible medium including data that, when accessed by a machine, cause the machine to drive a power switch in a power converter. Accordingly, it will be understood by those of ordinary skill in the art that various changes in form and details may be made without departing from the spirit and scope of the present invention as set forth in the following claims.

What is claimed is:

1. A power converter, comprising:
 a power switch adapted to receive an input power from an external power source and to generate an output power;
 an adaptive oscillator adapted to output an adaptive minimum-on signal of the power switch in response to a change in measured magnitude of the input power; and
 a controller adapted to output a PWM signal to the power switch, the PWM signal being determined in accordance with a SET signal, a RESET signal and the adaptive minimum-on signal,
 wherein the adaptive oscillator includes:
  a first comparator adapted to compare the measured magnitude to a reference value and to output a first comparison value, and
  a second comparator adapted to compare the first comparison value to a charge value realized during a charge period of the SET signal and to output a second comparison value.

2. The power converter as claimed in claim 1, wherein a duration of the PWM signal is determined in accordance with a later of a falling edge of the adaptive minimum-on signal and a rising edge of the RESET signal.

3. The power converter as claimed in claim 1, further comprising a synchronizer adapted to synchronize a rising edge of the adaptive minimum-on signal with a rising edge of the SET signal.

4. The power converter as claimed in claim 1, further comprising a synchronizer adapted to synchronize a rising edge of the adaptive minimum-on signal with a rising edge of the SET signal.

5. The power converter as claimed in claim 4, wherein a falling edge of the adaptive minimum-on signal corresponds to the second comparison value indicating the first comparison value exceeds the charge value.

6. An integrated circuit, comprising:
 a power switch adapted to receive an input power from an external power source and generate an output power; and
 a controller adapted to output a PWM signal to the power switch, the PWM signal being determined in accordance with a SET signal, a RESET signal and an adaptive minimum-on signal varying in accordance with a change in a measured magnitude of the input power, wherein the adaptive minimum-on signal is generated by comparing the measured magnitude to a reference value and outputting a first comparison value, and comparing the first comparison value to a charge value realized during a charge period of the SET signal and outputting a second comparison value.

7. A method of driving a power switch in a power converter, comprising:
    detecting a change in a magnitude of an input power from an external power source input to the power switch;
    generating an adaptive minimum-on signal in accordance with the detected magnitude; and
    driving the power switch using the adaptive minimum-on signal, a SET signal and a RESET signal,
    wherein generating the adaptive minimum-on signal includes:
        comparing the detected magnitude to a reference value and outputting a first comparison value, and
        comparing the first comparison value to a charge value realized during a charge period of the SET signal and outputting a second comparison value.

8. The method as claimed in claim 7, further comprising synchronizing a rising time of the adaptive minimum-on signal with a rising time of the SET signal.

9. The method as claimed in claim 8, wherein the PWM signal becomes low in response to the rising edge of the SET signal and becomes high in response to a later one of a falling edge of the adaptive minimum-on signal and a rising edge of the RESET signal.

10. The method as claimed in claim 7, wherein generating the adaptive minimum-on signal comprises providing a falling edge of the adaptive minimum-on signal when the second comparison value indicates the first comparison value exceeds the charge value.

11. The method as claimed in claim 10, wherein driving the power switch comprises generating a PWM signal from the SET signal, the RESET signal and the adaptive minimum-on signal.

12. The method as claimed in claim 7, wherein a duration of the adaptive minimum-on signal is inversely proportional to the detected magnitude.

13. A power converter, comprising:
    a power switch adapted to receive an input power from an external power source and generate an output power and be driven in accordance with an adaptive minimum-on signal, a SET signal and a RESET signal; and
    means for generating the adaptive minimum-on signal of the power switch having a duration that is inversely proportional to a measured magnitude of the input power by comparing the detected magnitude to a reference value and outputting a first comparison value, and comparing the first comparison value to a charge value realized during a charge period of the SET signal and outputting a second comparison value.

14. An integrated circuit, comprising:
    a power switch adapted to output an output power;
    a processing unit; and
    a memory unit operably coupled to the processing unit, the memory including operational instructions causing the processing unit to:
    detect a change in magnitude of an input power from an external power source input to the power switch;
    generate an adaptive minimum-on signal in accordance with the detected;
    drive the power switch using the adaptive minimum-on signal, a SET signal and a RESET signal;
    compare the detected magnitude to a reference value and to output a first comparison value, and
    compare the first comparison value to a charge value realized during a charge period of the SET signal and output a second comparison value.

15. The integrated circuit as claimed in claim 14, further comprising a functional circuit adapted to receive power from the power switch.

16. The integrated circuit as claimed in claim 14, wherein the power from the power switch is supplied to an external functional circuit.

17. An adaptive oscillator, comprising:
    a detector adapted to detect a change in a measured magnitude of a first signal and to output a detected value, the first signal being an input power from an external power source; and
    a comparator adapted to compare the detected value to a second signal having a ramped rising slope and an instantaneous falling slope and to output a third signal having a duration that is inversely proportional to the detected value.

18. The adaptive oscillator as claimed in claim 17, wherein the detector comprises a comparator adapted to compare the measured magnitude to a predetermined value.

19. The adaptive oscillator as claimed in claim 17, wherein the ramped rising slope corresponds to a charging period of a capacitor and the instantaneous falling slope corresponds to a discharging period of the capacitor.

20. The adaptive oscillator as claimed in claim 19, further comprising a synchronizer adapted to synchronize a ramp start time of the second signal and a rising edge of the third signal.

21. The adaptive oscillator as claimed in claim 19, wherein a falling edge of the third signal corresponds to an intersection of the detected value and the second signal.

22. Article of manufacture having a machine accessible medium including data that, when accessed by a machine, cause the machine to perform a method of driving a power switch in a power converter, the method comprising:
    detecting a change in a magnitude of an input power from an external power source input to the power switch;
    generating an adaptive minimum-on signal in accordance with the detected magnitude;
    driving the power switch using the adaptive minimum-on signal, a SET signal and a RESET signal;
    comparing the detected magnitude to a reference value and outputting a first comparison value; and
    comparing the first comparison value to a charge value realized during a charge period of the SET signal and outputting a second comparison value.

* * * * *